United States Patent [19]

Neal

[11] 4,336,902
[45] Jun. 29, 1982

[54] THERMOSTAT ALTERABLE BY REMOTE CONTROL

[76] Inventor: Albert D. Neal, 17272 Blue Fox Cir., Huntington Beach, Calif. 92647

[21] Appl. No.: 282,403

[22] Filed: Jul. 13, 1981

Related U.S. Application Data

[63] Continuation of Ser. No. 846,517, Oct. 28, 1977, abandoned.

[51] Int. Cl.³ ............................................ G05D 23/00
[52] U.S. Cl. .................................... 236/46 R; 236/41; 236/51
[58] Field of Search ......................... 236/46 R, 47, 51; 165/12

[56] References Cited

U.S. PATENT DOCUMENTS 3,159,212 12/1964 Patrick ................................. 165/26
3,917,165 11/1975 Cross ................................. 236/47 X

*Primary Examiner*—William E. Wayner

*Attorney, Agent, or Firm*—Natan Epstein; George F. Smyth

[57] ABSTRACT

An improvement for a thermostatic control system of the type in which a heater having two electrical terminals is turned on when a conductive path is established between the two terminals and is turned off when the conductive path is opened, and in which first thermostat is used to open and close the conductive path. The improvement is a series combination of a remotely controlled electrical switch and a second thermostat, the series combination being connected to the heater terminals in parallel with the first thermostat. The second thermostat is normally set to a temperature greater than the temperature to which the first thermostat is set. The first thermostat controls the heater to standby temperature until a signal is applied to the remotely controlled electrical switch. Upon receipt of a predetermined signal, control is passed to the second thermostat which thereafter maintains a higher temperature. A second signal opens the switch, returning control to the first thermostat, and the temperature returns to the standby temperature.

8 Claims, 3 Drawing Figures

THERMOSTAT ALTERABLE BY REMOTE CONTROL

This is a continuation of application Ser. No. 846,517, filed Oct. 28, 1977, now abandoned.

BACKGROUND OF THE INVENTION

The present invention is in the field of thermostatic control and more specifically relates to a system which controls the temperature to a standby setting unless and until a command is applied to cause the system to control the temperature to a predetermined higher value.

It is well known that a thermostat may be used to control the operation of a furnace or heater to produce a nearly-constant temperature at the thermostat. In the type of system most commonly used in homes, the heat is supplied by a furnace and the thermostat is mounted on a wall in the room whose temperature is to be controlled. Typically, the furnace includes two electrical terminals. When a conductive path is established between these terminals, the furnace is turned on, but when the conductive path is opened, the furnace is turned off. A typical thermostat of the type used in homes includes a bimetallic element which is arranged to tilt a mercury switch so as to close the switch when the room temperature, also called the ambient temperature, falls below a preset temperature. The contacts of the thermostatic switch normally are connected to the terminals of the furnace, so that when the ambient temperature falls below the preset temperature, a conductive path is established between the two terminals of the furnace through the thermostat.

The typical thermostat control system described above normally includes means for setting in various selected temperatures which the system then seeks to maintain. With such a system, it is necessary to adjust the thermostat each time the ambient temperature is to be changed.

If it is known in advance that certain temperatures are desired at certain times of the day, the necessity for re-setting the thermostat can be avoided. It is known in the art to employ a clock-driven timer switch to cut in an override thermostat set to a higher temperature than the thermostat normally used. This permits the ambient temperature to be programmed between two temperature levels in a pattern which repeats from day to day.

Temperature programmed systems suffer from a lack of flexibility. Thus, where the pattern of temperature changes is too unpredictable to be forecast on a day-to-day basis, a system using a clock programmed switch is of little use.

In U.S. Pat. No. 3,159,212, issued Dec. 1, 1964 to Patrick, there is disclosed a portable thermostat which can be connected electrically to the furnace from one of a number of locations so as to be usable for controlling the temperature at a chosen location. While this offers some advantages with regard to heating efficiency, it does not eliminate the necessity of having to re-set the thermostat each time a temperature change is desired.

The present invention provides a greater degree of flexibility of operation than the systems of the prior art, and the present invention represents a definite improvement over the prior art systems in its ability to converse energy where the demand is irregular.

SUMMARY OF THE INVENTION

The present invention is intended for use with systems wherein a furnace is connected to a standby thermostat so that the furnace is operated to bring the ambient temperature up to the chosen temperature set on the standby thermostat. The present invention includes an override thermostat connected in parallel with the standby thermostat and set to a temperature greater than the chosen temperature set on the standby thermostat. The switch in series with the override thermostat determines whether at any particular moment, the override thermostat is in the circuit. When the switch is closed, the override thermostat controls the furnace, attempting to warm the ambient air to a temperature equal to that set on the override thermostat. When the switch is opened, the override thermostat is disconnected from the system and it is immaterial whether the override thermostat is conductive or non-conductive. When the switch is open, control is with the standby thermostat.

The operation and advantages of the present invention may best be understood from an example. Suppose a person visited his vacation cabin occasionally on weekends. Not wishing to waste energy, the individual would not normally keep the cabin heated. On the other hand, if the individual does not begin to heat the cabin until he arrives at it, the cabin will be uncomfortably cold for several hours after he arrives. To prevent the plumbing from freezing, he may wish to maintain the ambient temperature within the cabin a few degrees above freezing. For this, the standby thermostat and furnace would serve adequately.

With the present invention, the individual can activate the switch from a remote location, thereby cutting in the override thermostat which is set to a more comfortable ambient temperature. Because the switch can be actuated remotely, the individual can initiate the heating cycle while he is still some distance away from the cabin and at some time in advance of his arrival.

From this example, it can be seen that the present invention is most useful in those situations wherein it it desired at irregular times to increase the ambient temperature. When used in this manner, the present invention results in an obvious saving of energy. The key to the usefulness of the present invention is its ability to anticipate the time interval when the higher temperature is required and to initiate heating by the furnace so that when the interval arrives, the temperature will have increased to its higher level.

The present invention can also be used advantageously in clock-programmed systems wherein the override thermostat is cut in at the same time each day. In such systems, the present invention can be used to override the clock-programmed system to permit irregular heating cycles to be superimposed on the clock-programmed cycle.

Normally, the override thermostat is mounted in close proximity to the standby thermostat, although this is not strictly necessary. In the preferred embodiment, the switch is a remotely controlled device and the means used for control can include long lead wires to the switch, or it can take the form of a wireless system using either radio control or acoustic control. In the latter cases, there is a transmitter and receiver for the type of waves used, and the receiver includes means for actuating the switch. In another embodiment of the system, the switch is actuated by receipt of a telephone call or by the ringing of a telephone.

In a preferred embodiment, the present invention is to be sold in the form of a kit for modifying an existing temperature control system. In that embodiment, the kit includes a transmitter and receiver, the switch, the override thermostat, and a set of instructions for connecting the units.

The novel features which are believed to characterize the invention, both as to its organization and method of operation, together with further objects and advantages thereof, will be better understood from the following description considered in connection with the accompanying drawings, in which a preferred embodiment of the invention is illustrated by way of examples.

DESCRIPTION OF THE PREFERRED EMBODIMENT

Figure 1:
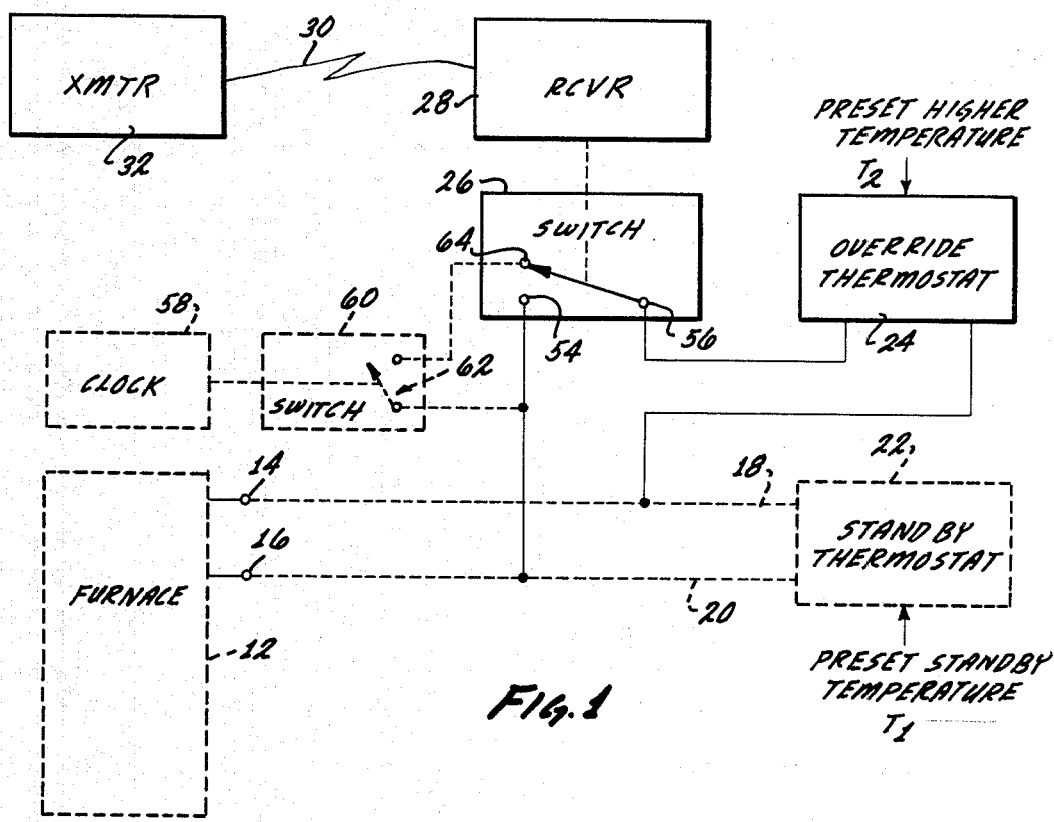
FIG. 1 is a block diagram showing how the system of the present invention is connected to an existing temperature control system.

Turning now to the drawings, in which like parts are denoted throughout by the same reference numerals, there is shown in FIG. 1 a block diagram showing how the present invention is attached to an existing temperature system. The existing temperature control system includes a furnace 12 having two electrical terminals, 14, 16, to which are connected the leads 18, 20 of a standby thermostat 22. The furnace 12 generates heat when a conductive electrical path is established between the terminals 14, 16. The standby thermostat 22 includes a switch (not shown) which establishes a conductive electrical connection between the leads 18, 20 when the ambient temperature falls below a chosen preset temperature. When the standby thermostat 22 is connected to the furnace 12, the result is that the furnace generates heat when the ambient temperature at the thermostat 22 falls below the preset temperature and the furnace 12 ceases to generate heat when the ambient temperature is greater than the preset temperature.

According to the present invention, an override thermostat 24 is connected in series with the switch 26 to form a series combination. That series combination is then connected in parallel with the standby thermostat 22 to the terminals 14, 16 of the furnace.

The switch 26, in a preferred embodiment, is actuated by a radio receiver 28 in response to a signal 30 produced by a remotely-located transmitter 32. In other embodiments, the transmitter 32 could produce acoustical signals 30, which are then received by an acoustical receiver 28 for initiating activation of the switch 26. In the preferred embodiment, the switch 26 is an electrical relay actuated by an electrical signal from the receiver 28. In an alternative embodiment, the switch 26 is a rotary switch actuated by a motor and/or escapement. The motor could be electrical or mechanical, such as a spring driven motor. If a rotary switch is used, a number of override thermostats may be employed to permit a selection of preset higher temperatures.

Figure 2:
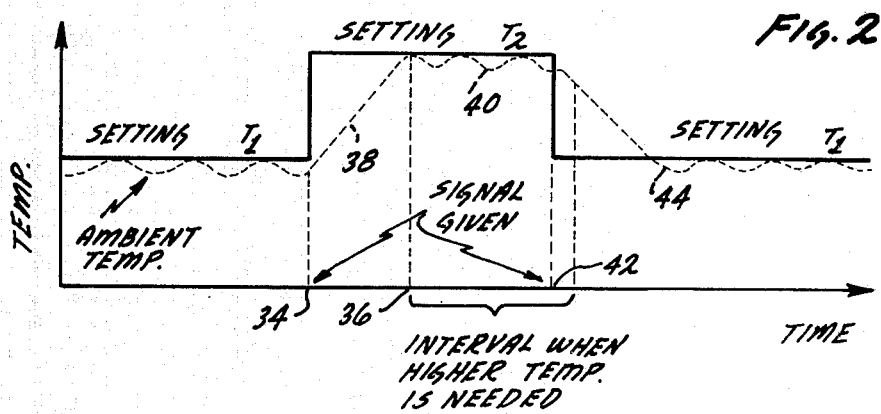
FIG. 2 is a graph showing the operation of the system in producing a change of temperature upon command; and, FIG. 3 is a top view of a kit containing the components of the present invention.

FIG. 2 is a graph showing the operation of the system according to the present invention. It is contemplated that during a rather lengthy time of perphaps on the order of a day or a week, the standby thermostat 22 would operate to maintain the ambient temperature equal to the standby temperature preset on the standby thermostat. As shown in FIG. 2, each time the ambient temperature rises to $T_1$, the switch inside the standby thermostat 22 opens and the furnace is turned off. The ambient temperature begins to fall, but the standby thermostat senses that the temperature is below $T_1$ and the switch in the thermostat closes thereby starting the furnace again. As a result, the ambient temperature fluctuates slightly but is maintained generally at or very near to the desired standby temperature $T_1$.

The person using the system recognizes that he will require a higher temperature beginning approximately at the time 36 indicated on the graph. Anticipating the requirement for a higher temperature at the time 36, the person using the system operates the transmitter 32 to produce a signal 30 which is received by the receiver 28 to close the switch 26 thereby cutting in the override thermostat 24 at the time 34 shown on the graph of FIG. 2. Because the ambient temperature is below the preset higher temperature $T_2$ set into the override thermostat 24, the furnace 12 is turned on under the control of the override thermostat 24 and the ambient temperature begins to rise as indicated by the curve 38. Eventually, the ambient temperature stabilizes at approximately the preset higher temperature $T_2$ as indicated by the curve at 40. Thus, the system of the present invention allows the user to anticipate an irregularly occurring requirement for a higher temperature and to initiate a command signal causing the furnace to initiate its heating action sufficiently in advance of the interval when the higher temperature is required so that the ambient temperature will reach the desired temperature at the desired time.

The time interval during which the higher temperature prevails likewise may be irregular, that is, of arbitrary length. When the user recognizes that he no longer needs the higher temperature, he initiates another command signal via the transmitter 32 and the receiver 28 to open the switch 26 at the time 42 to return control of the furnace to the standby thermostat 22. At that time, the switch in the standby thermostat 22 will be open because the ambient temperature is necessarily greater than the preset standby temperature $T_1$, and, therefore, the furnace 12 will remain off until the ambient temperature falls below $T_1$ as indicated at 44. Thereafter, the standby thermostat 22 will control the furnace to produce an ambient temperature approximately equal to $T_1$.

The present invention thus has considerable potential for saving energy in situations where it is desired to maintain a standby temperature except for certain irregularly-occurring intervals when a higher temperature is needed.

Figure 3:
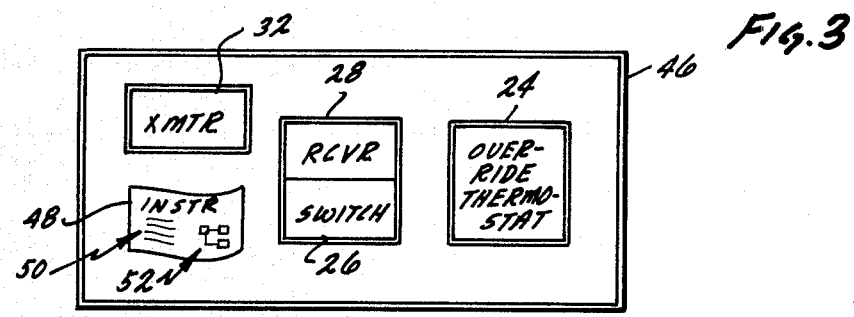

It is contemplated that the present invention should be marketed as a kit such as that shown in FIG. 3, in a preferred embodiment. Because most installations already include a furnace and a thermostat, it is necessary to supply only the additional elements of the system, which include a transmitter 32, the receiver 28, the switch 26, and the override thermostat 24. In the preferred embodiment of the kit, the components are packaged in a box 46 along with a sheet of written or printed instructions 48, including written text 50 and diagrams 52.

In the preferred embodiment described above, the switch 26 of FIG. 1 is a simple single pole, single throw switch including only the terminals 54, 56. It is recognized, however, that the present invention can also be used to override the normal operation of a programmed temperature control system.

Such a programmed temperature control system is shown in FIG. 1 in dashed lines. It includes a clock 58 which is used to drive a clock-programmed switch 60 so that the contact 62 of the switch 60 is opened and closed at predetermined times during the day in a regular daily cycle.

In such a programmed system, the contact 64 is permanently connected to the contact 56 of FIG. 1. In the normal operation of such a system, the standby thermostat 22 controls the ambient temperature and the operation of the furnace 12 except when the switch 60 is closed, which cuts in the override thermostat 24 which is a part of the clock programmed temperature control system.

In an embodiment of the present invention intended for use with a clock programmed temperature control system such as described above, the switch 26 is a single pole double throw switch whose position is controlled by the receiver 28 in response to signals 30 produced by the transmitter 32. The embodiment of the present invention for use with the clock programmed temperature control system includes the transmitter 32, the receiver 28, and the switch 26, the latter being a single pole, double throw switch in this embodiment.

The operation of this embodiment of the present invention is as follows. Normally, the switch 26 would be in the position wherein the terminals 56 and 64 are interconnected. In this position, the standby thermostat 22 controls the furnace unless the switch 60 is closed, which cuts in the override thermostat 24 to produce a higher temperature. If it is desired to increase the temperature prior to the time at which the temperature increase is programmed, the user operates the transmitter 32 to send a signal 30 to the receiver 28 to actuate the switch 26, breaking the connection between the terminals 56, 64 and establishing a conductive path between the terminals 54, 56. This immediately cuts in the override thermostat 24 which immediately begins to control the temperature toward the preset higher temperature $T_2$. Subsequent closing of the switch 60 when the terminals 54 and 56 of the switch 26 are interconnected will be ineffective, and, therefore, the commanded temperature is deemed to override the programmed system. When it is desired to return to programmed control, the user produces a command signal on the transmitter 32 which upon receipt by the receiver 28 results in return of the switch 26 to its original position wherein the terminal 56 is connected to the terminal 64. In this latter condition, the override thermostat 24 will be in or out of the system depending on whether the switch 60 is open or closed in accordance with the clock controlled program.

Thus, there has been described an energy saving temperature control system which is particularly suited for situations in which it is necessary at unpredictable times to command a higher temperature and to maintain the higher temperature for indeterminate intervals. The present invention can be regarded as a complete temperature control system, or alternatively as an improvement to existing temperature control systems. In the latter embodiment, the invention would be made available in the form of a kit including instructions for installing the improvement into existing systems.

The foregoing detailed description is illustrative of several embodiments of the invention, and it is to be understood that additional embodiments thereof will be obvious to those skilled in the art. The embodiments described herein, together with the additional embodiments, are all considered to be within the scope of the present invention.

What is claimed is:

1. In a clock-programmed temperature control system including a furnace having two electrical terminals and producing heat when a conductive electrical connection is established between the terminals, including a standby thermostat connected between the two terminals of the furnace and establishing an electrical connection between them when said standby thermostate senses the ambient temperature to be less than a preset standby temperature and opening the electrical connection between them when said standby thermostat senses the ambient temperature to be greater than the preset standby temperature, and including a clock-programmed switch connected in series with an override thermostat to form a series combination which series combination is connected across the furnace terminals in parallel with said standby thermostat, said override thermostat being operative only when said clock-programmed switch is closed to establish an electrical connection between the two terminals of the furnace when said override thermostat senses the ambient temperature to be less than a present higher temperature greater than said standby temperature and opening the electrical connection between the two terminals of the furnace when said override thermostat senses the ambient temperature to be greater than the preset higher temperature, an improvement for selectively overriding the clock-programmed temperature control system and transferring control of the furnace to said override thermostat, and later for returning control of the clock-programmed temperature control system, said improvement comprising:

a remotely controlled single pole double throw electrical switch responsive to applied commands to selectively connect a common terminal to a first and a second terminal, said switch being connected in said series combination between said override thermostat and said clock-programmed switch with said override thermostat connected to said common terminal, said clock-programmed switch connected to said first terminal and said second terminal connected to a different terminal of the furnace than the one to which said override thermostat is connected so as to vest control of the furnace in said clock-programmed temperature control system when said common terminal is connected to said first terminal and to vest control of the furnace in said override thermostat when said common terminal is connected to said second terminal.

2. The improvement of claim 1 wherein said remotely controlled electrical switch is a relay.

3. The improvement of claim 1 wherein said remotely controlled electrical switch is a radio-controlled electrical switch.

4. The improvement of claim 1 further comprising a radio transmitter emitting a signal effective to operate said radio-controlled switch.

5. In a clock-programmed temperature control system for controlling a furnace having two electrical terminals and producing heat when a conductive electrical connection is established between the terminals, said system including a standby thermostat connectable between the two terminals of the furnace and establishing an electrical connection between them when said standby thermostat senses the ambient temperature to be less than a preset standby temperature and opening the electrical connection between them when said standby thermostat senses the ambient temperature to be greater than the preset standby temperature, and including a clock-programmed switch connected in series with an override thermostat to form a series combination, which series combination is connected across the furnace terminals in parallel with said standby thermostat, said override thermostat being operative only when said clock-programmed switch is closed to establish an electrical connection between the two terminals of the furnace and said override thermostat senses the ambient temperature to be less than a preset higher temperature greater than said standby temperature, the electrical connection between the two terminals of the furnace being interrupted when said override thermostat senses the ambient temperature to be greater than the preset higher temperature, an improvement for selectively overriding the clock-programmed temperature control system and transferring control of the furnace to said override thermostat, and later for returning control to the clock-programmed temperature control system, said improvement comprising:

switch means responsive to remotely applied command signals, said switch means being connected in series combination with said override thermostat but in parallel with said clock-programmed switch, said switch means being selectively operative in one state to bypass said clock-programmed switch to vest control of said furnace in said override thermostat irrespective of the condition of said clock-programmed switch, and in another state to remove said bypass.

6. The improvement of claim 5 wherein said remotely commanded switch means includes a relay.

7. The improvement of claim 5 wherein said remotely commanded electrical switch is responsive to a radio frequency control signal.

8. The improvement of claim 5 or claim 7 further comprising radio frequency transmitter means emitting a signal effective to operate said remotely commanded switch.

* * * * *